(12) United States Patent
Liu

(10) Patent No.: US 6,480,358 B2
(45) Date of Patent: *Nov. 12, 2002

(54) SUPER-TEXTURED AIR BEARING SURFACE SLIDER DESIGN FOR DATA TRANSDUCERS IN ROTATING MEDIA RANDOM ACCESS COMPUTER MASS STORAGE DEVICES

(75) Inventor: Hain-Ling Liu, Northborough, MA (US)

(73) Assignee: Max Maxtor Corporation, Longmont, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/951,838

(22) Filed: Sep. 13, 2001

(65) Prior Publication Data

US 2002/0030937 A1 Mar. 14, 2002

Related U.S. Application Data

(63) Continuation of application No. 09/363,903, filed on Jul. 28, 1999, now Pat. No. 6,297,932.

(51) Int. Cl.[7] .............................................. G11B 5/60
(52) U.S. Cl. .................................................... 360/235.8
(58) Field of Search .......................... 360/235.8, 236.6

(56) References Cited

U.S. PATENT DOCUMENTS

| | | | |
|---|---|---|---|
| 5,815,346 A | 9/1998 | Kimmal et al. | 360/103 |
| 5,973,881 A | 10/1999 | Ajiki | 360/103 |
| 6,055,128 A | 4/2000 | Dorius et al. | 360/103 |
| 6,144,529 A | 11/2000 | Wada et al. | 360/236.1 |
| 6,212,042 B1 * | 4/2001 | Gui et al. | 360/236.6 |
| 6,304,418 B1 * | 10/2001 | Boutaghou et al. | 360/236.6 |

* cited by examiner

Primary Examiner—Jefferson Evans

(57) ABSTRACT

A textured air bearing surface ("ABS") slider design of particular utility in devices which utilize an air bearing surface to control the flying height or spacing between two relatively moving surfaces such as the sliders designed for use in conjunction with the read/write data transducer elements in a hard disk drive. The textured ABS slider provides much improved slider-to-media stiction and contact start stop ("CSS") performance due to its provision of much earlier take-off characteristics which is of particular importance for use with high RPM drive designs which allow for higher data throughput. At low RPMs the fly height of the slider is increased while the fly height remains substantially the same at normal operating speeds. The textured ABS slider design disclosed may be readily effectuated with only minimal design and processing changes.

24 Claims, 4 Drawing Sheets

SUPER-TEXTURED AIR BEARING SURFACE SLIDER DESIGN FOR DATA TRANSDUCERS IN ROTATING MEDIA RANDOM ACCESS COMPUTER MASS STORAGE DEVICES

CROSS-REFERENCE TO RELATED APPLICATIONS

This application is a continuation of U.S. application Ser. No. 09/363,903, filed Jul. 28, 1999, now U.S. Pat. No. 6,297,932.

BACKGROUND OF THE INVENTION

The present invention relates, in general, to the field of air bearing surface ("ABS") slider designs for use in conjunction with data transducers in rotating media random access computer mass storage devices. More particularly, the present invention relates to a textured ABS design of especial applicability in devices which utilize an air bearing surface to control the flying height or spacing between two relatively moving surfaces such as in conjunction with the read/write elements in a hard disk drive.

Lowering the flying height of a slider carrying a data transducer in conjunction with a rotating computer mass storage element such as a disk is necessary to allow for the reading or writing of data which is stored with ever increasing areal density. In turn, this lowered flying height has resulted in the exacerbation of two critical tribological parameters. Firstly, a high degree of slider-to-media stiction is encountered when the heads are parked which might prevent the sliders carrying the read/write elements from separating from the media surface upon initial drive start-up rendering them unworkable. Secondly, severe contact start/stop ("CSS") conditions and concomitant head and media wear may be experienced due to the decrease in the slider flying height and the trend toward ever faster media rotational speeds.

Heretofore, a number of differing approaches have been attempted with respect to ameliorating the problems of slider stiction and contact start/stop encountered due to ever decreasing slider flying heights and increasing media rotation speed. Among these has been the use of a ramp loading technique, the use of padded sliders and the provision of transversely textured media.

The first approach involves the provision of a ramp loading of the sliders and access arms to the media surface. However, this technique has generally not proven satisfactory and its use has been predominantly limited to hard disk drives having a 2.5 inch form factor. Moreover, due to the tight mechanical tolerance of the ramps required within the drive head disk assembly ("HDA"), this technique of necessity limits the number of disk media that can be incorporated in a particular drive design for a given form factor. Other problems include the necessity for providing the additional ramp components and modified suspension designs, the requirement for entirely new servo function algorithms and the uncertainty regarding the tribology of the ramp and suspension elements. Importantly, such a design fails if the sliders accidentally impact with or land on the media surfaces.

The use of padded sliders has also been attempted, but the technique is not as yet fully mature in the disk drive industry and is currently not a satisfactory solution. Importantly, it worsens the contact stop/start performance due to the protruding pads and it performs poorly in higher revolution per minute ("RPM") designs which can result in severe pad wear and potentially cause high stiction problems.

Finally, the use of transversely textured media is, again, not yet a fully mature technology and requires the design and implementation of an entirely new manufacturing process to produce such textured media. Still further, the technique requires more research in order to fully optimize the texture design in order to minimize the risk of high slider-to-media stiction.

SUMMARY OF THE INVENTION

The textured air bearing surface design of the present invention provides a solution to the aforementioned problems, which is vastly superior to the three conventional techniques described. It not only solves the critical stiction and contact start/stop tribology problems but does so in an extremely efficient manner without requiring significant design changes and with only a relatively straightforward alteration to existing processes for producing conventional sliders.

The present invention advantageously provides a textured ABS design of particular utility in devices which utilize an air bearing surface to control the flying height or spacing between two relatively moving surfaces such as the sliders designed for use in conjunction with the read/write data transducer elements in a hard disk drive. The textured ABS slider design of the present invention functions extremely well with much lower laser bump heights (or even without the provision of laser bumps) which is a critical factor in achieving ever increasing higher data areal densities in disk drives while concomitantly providing acceptable slider-to-media stiction performance. Furthermore, the much earlier take-off characteristics of the textured ABS design herein disclosed renders it also of great importance for use with high RPM drive designs in order to achieve higher data throughput with decreased head and media wear.

Particularly disclosed herein is a slider for use in conjunction with a storage medium in a computer mass storage device. The slider comprises at least one air bearing surface formed on a surface proximal to the storage medium, the air bearing surface including generally coplanar leading and trailing edge portions and an intermediate portion therebetween. The slider also comprises at least one area formed in the intermediate portion of the air bearing surface, the area being non-coplanar with the leading and trailing edge portions and displaced from the storage medium.

Further disclosed herein is a process for producing a slider for use in conjunction with a storage medium in a computer mass storage device. The process comprises the steps of forming at least one air bearing surface on a surface of the slider proximal to the storage medium, the air bearing surface including generally coplanar leading and trailing edge portions and an intermediate portion therebetween, and removing at least one area in the intermediate portion of the air bearing surface, the area being non-coplanar with the leading and trailing edge portions and displaced from the storage medium.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
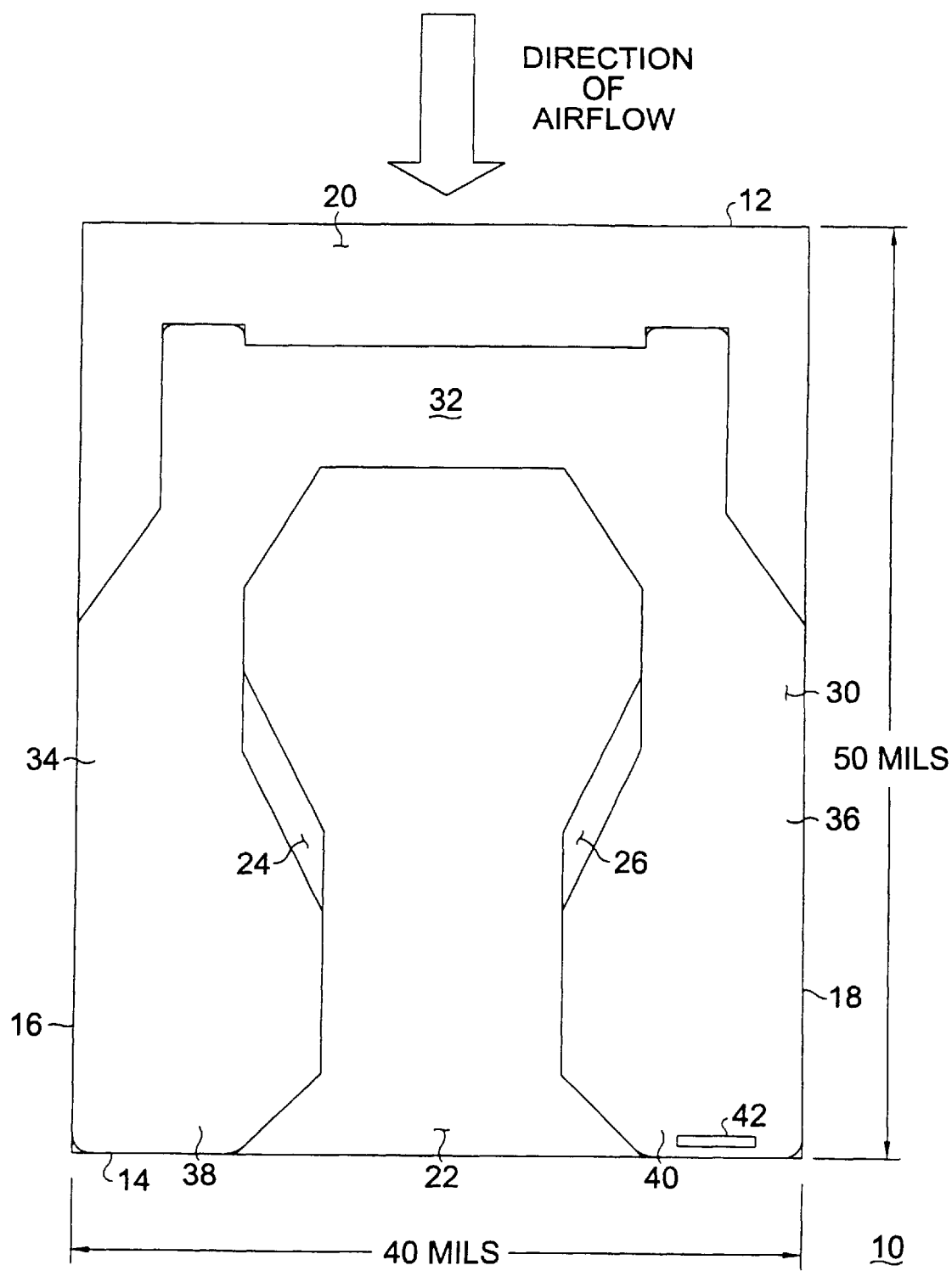
FIG. 1 is a representative ABS view of a conventional sub-ambient pressure disk drive read/write head slider illustrating a relatively deep cavity in the central portion thereof with adjoining shallow step regions and a relatively more shallow leading edge step area defining a substantially planar ABS surface.

With reference now to a representative ABS view of a conventional sub-ambient pressure disk drive read/write head slider 10 is shown. The conventional slider 10 extends from a leading edge 12 that intercepts the airflow between the slider 10 and an associated rotating media to an opposite trailing edge 14. The slider 10, which in the simplified representational view shown has a length of on the order of 50 mils, may further have a width of substantially 40 mils between a left side 16 and opposite right side 18. It should be noted that these dimensions are not critical in producing a slider in accordance with the present invention. Further the particular design of the slider 10 is shown for illustrative purposes only and the principles of the present invention are applicable to all types of slider designs including those other than illustrated herein.

Adjoining the leading edge 12 is a relatively shallow step area 20 that may be on the order of 0.2 μm below the level of the air bearing surface, which will be more fully described hereinafter. As shown, the slider 10 also incorporates a relatively deep cavity 22 in the central portion thereof which may be substantially 2.0–3.0 μm below the level of the air bearing surface. The central cavity 22 also may incorporate adjoining shallow step regions 24, 26 that are defined at about the same depth as that of the step area 20.

A substantially "Ω" shaped air bearing surface 30 is then defined on the ABS side of the slider 10 by the aforementioned features. The air bearing surface 30 includes a substantially horizontally extending portion 32, as well as opposing central portions 34, 36 and distal end portions 38, 40 adjoining the trailing edge 14 defining left and right ABS rails respectively. A data write/read head 42, for example comprising a magnetoresistive or giant magnetoresistive sensor and associated write element may be positioned substantially as shown adjoining the trailing edge 14 of the slider 10 to enable data to be read from, and/or written to, an associated computer mass storage medium such as a disk drive.

As shown, the air bearing surface 30 of the conventional slider 10 is substantially planar across all of the portions 32, 34, 36, 38 and 40, although a slight convexity of the air bearing surface 30 towards the media may be provided from the leading edge 12 to the trailing edge 14 (or from the left side 16 to the right side 18). In any event, when the air bearing surface 30 of the slider 10 comes in contact with an associated medium in the landing zone of the disk, contact will be made in all of these portions of the air bearing surface 30 thereby producing a substantial amount of stiction. Moreover, the contact start/stop friction, stiction and associated wear on the slider 10 and media surface are a function of the amount of the air bearing surface 30 which actually comes in contact with the media surface.

Figure 2:
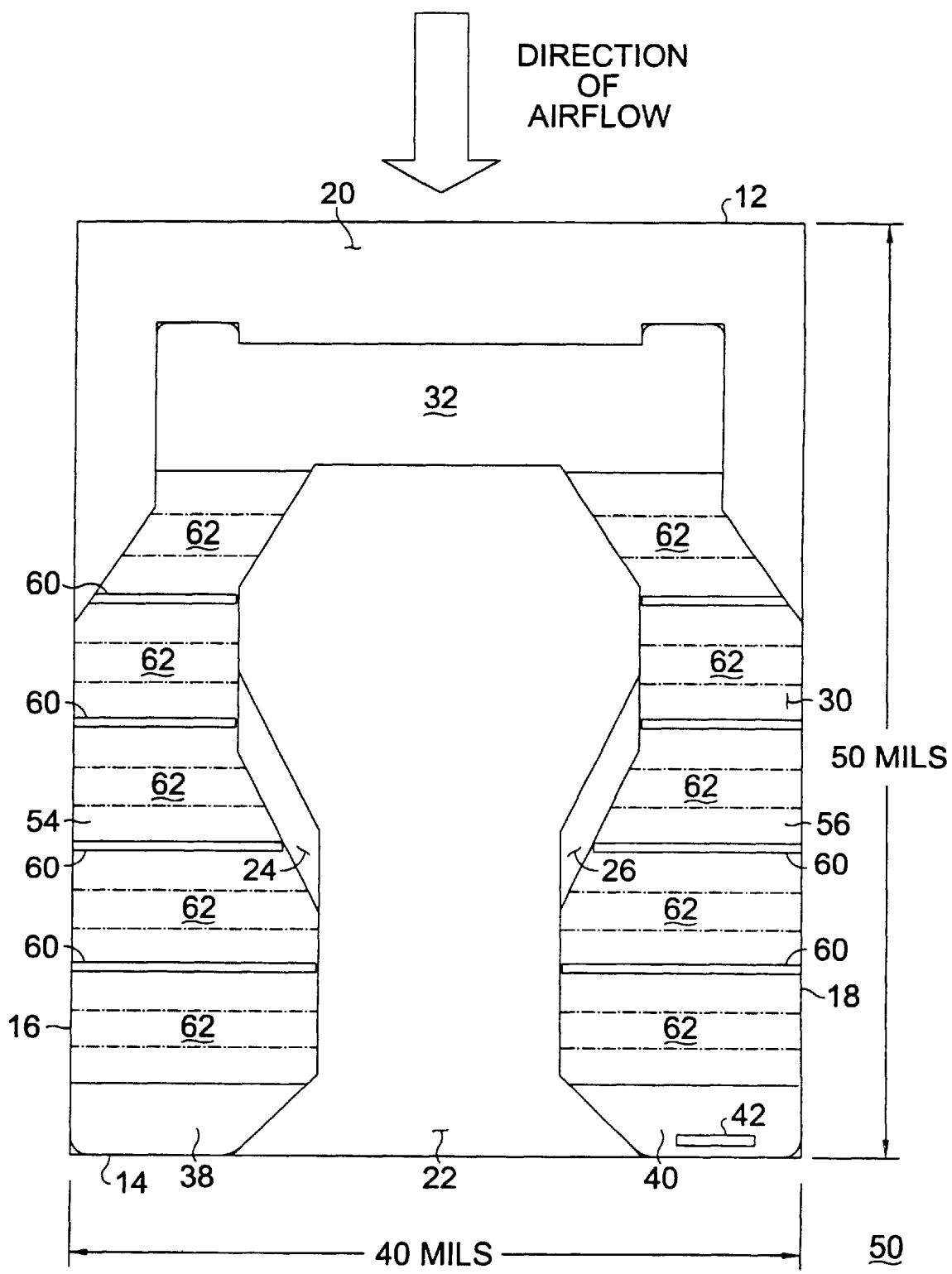
FIG. 2 is an ABS view of a comparable slider design in accordance with one embodiment of the present invention with certain structural features corresponding to that of the conventional slider of the preceding figure but further incorporating a textured air bearing surface in accordance with the disclosure of the present invention.

With reference additionally now to FIG. 2, a representative ABS view of a corresponding design slider 50 in accordance with a specific embodiment of the present invention is shown. Similarly to the conventional slider 10 (FIG. 1) the slider 50 extends from a leading edge 12 which intercepts the airflow between the slider 50 and an associated rotating media to an opposite trailing edge 14. The slider 50, which in the simplified representational view shown also may have a length of on the order of 50 mils, may further have a width of substantially 40 mils between a left side 16 and opposite right side 18. As stated previously, the dimensions and particular design of the slider 50 shown is for illustrative and comparative purposes only and the principles of the present invention are applicable to all types of air bearing sliders.

As previously described with respect to the conventional slider 10 (FIG. 1), adjoining the leading edge 12 is a relatively shallow step area 20 which may be on the order of 0.2 μm below the level of the textured air bearing surface which will be more fully described hereinafter. As shown, the slider 50 also incorporates a relatively deep cavity 22 in the central portion thereof which may be substantially 2.0–3.0 μm below the level of the textured air bearing surface. The central cavity 22 also may incorporate adjoining shallow step regions 24, 26 that are defined at about the same depth as that of the step area 20.

A substantially "Ω" shaped textured air bearing surface 30 is then defined on the ABS side of the slider 10 by the aforementioned features. The textured air bearing surface 30 includes a substantially horizontally extending portion 32, as well as opposing central portions 54, 56 and distal end portions 38, 40 adjoining the trailing edge 14 defining left and right ABS rails respectively. As before, a data write/read head 42, for example comprising a magnetoresistive or giant magnetoresistive sensor and associated write element may be positioned substantially as shown adjoining the trailing edge 14 of the slider 50 to enable data to be read from, and/or written to, an associated computer mass storage medium such as a disk drive.

In the representative embodiment of the slider 50 shown, the central portions 54, 56 may include a number of substantially planar strips 60 between laterally extending textured areas 62. (It should be noted that the principles of the present invention are likewise applicable to a slider 50 which does not include any finite-width strips 60.) The strips 60 are substantially coplanar with the portions 32, 38 and 40 while the textured areas 62 are displaced inwards to a depth below that of the portions 32, 38 and 40 of the air bearing surface 30. In a representative embodiment of the present invention, the textured areas 62 may be formed by selective material removal from the air bearing surface 30 in the area of the portions 54 and 56 by means of focused ion beam etching or other known dry or wet etching techniques. The depths for the textured areas 62 may be in the range of substantially 0.01 μm or greater and the shapes of the textured areas 62 may be substantially sinusoidal, tapered, stepped or other possible shapes or configurations.

It should also be noted that any number of textured areas 62 may be formed in each rail of the air bearing surface 30 of the slider 50. For example, a single textured area 62 may then be formed in each rail thereby requiring no associated strip 60. Nevertheless, if two or more textured areas 62 are utilized, then a lesser corresponding number of interstitial strips 60 can be used with substantially 0.05–0.5 mm between the strips 60. The width of the strips themselves may vary between essentially zero (i.e. a line) to up to on the order of 250 µm or more. Experimentally, anywhere from 1 through 10 textured areas 62 may be utilized to provide the benefits disclosed herein although more than 10 may be utilized as well. In the example shown in FIG. 2, texturing has been provided over substantially 70% of the surface area of the air bearing surface 30 of the slider 50.

Figure 3:
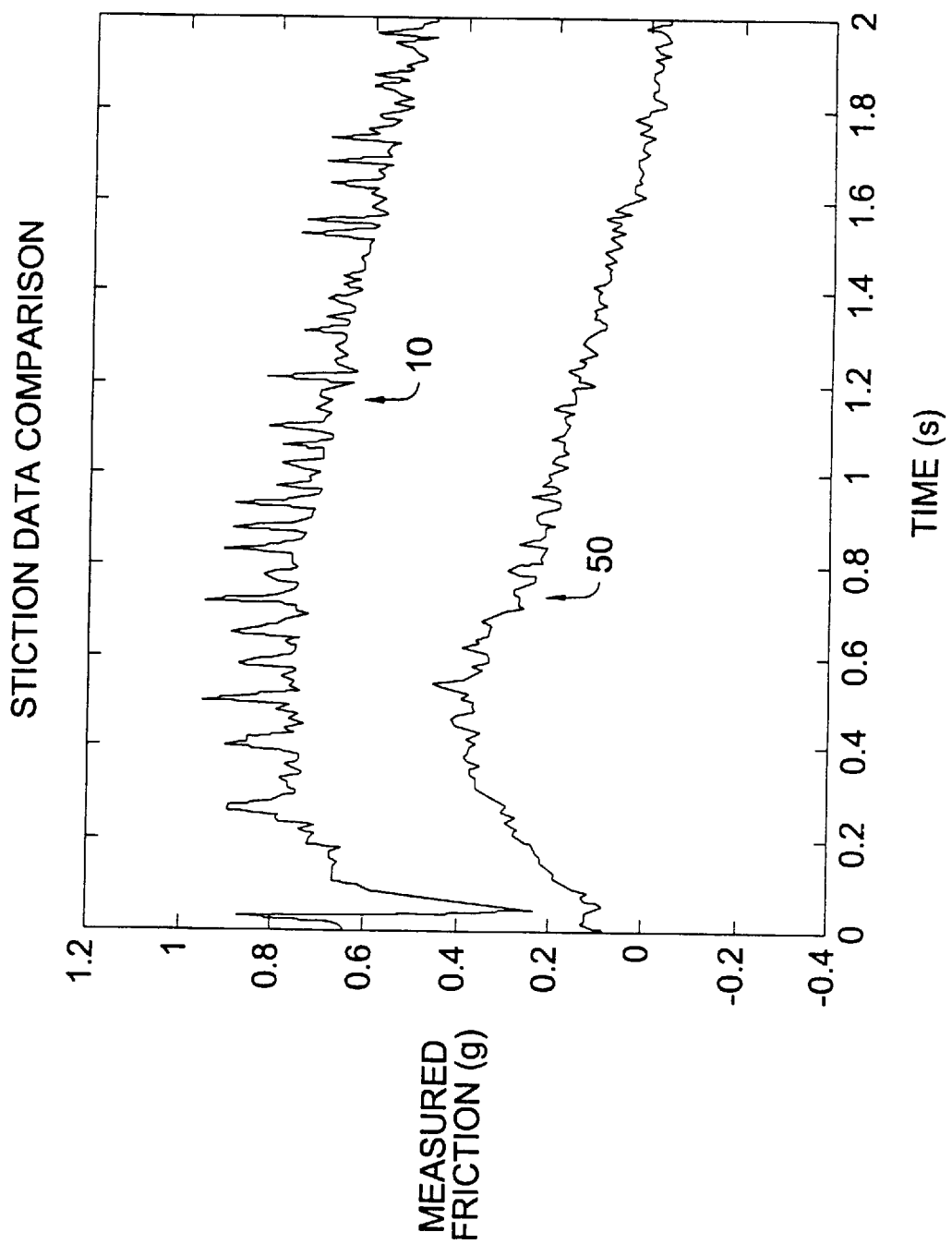
FIG. 3 is a graphical representation of the stiction and friction characteristics of a conventional slider as illustrated in FIG. 1 together with the same characteristics of a textured ABS slider in accordance with the present invention as illustrated in FIG. 2 showing much reduced measured stiction and friction with the associated media as a function of time.

With reference additionally now to FIG. 3, a graphical representation of the stiction and friction characteristics of a conventional slider 10 as illustrated in FIG. 1 is shown together with that of a textured ABS slider 50 in accordance with the present invention as illustrated in FIG. 2. A comparison of the stiction characteristics of the conventional slider 10 (upper trace) with that of a textured ABS slider 50 (lower trace) in accordance with the present invention on the same media showed virtually no stiction (magnitude of the first friction peak) with the textured ABS slider 50 design compared to 0.85 grams with the conventional slider 10.

Figure 4:
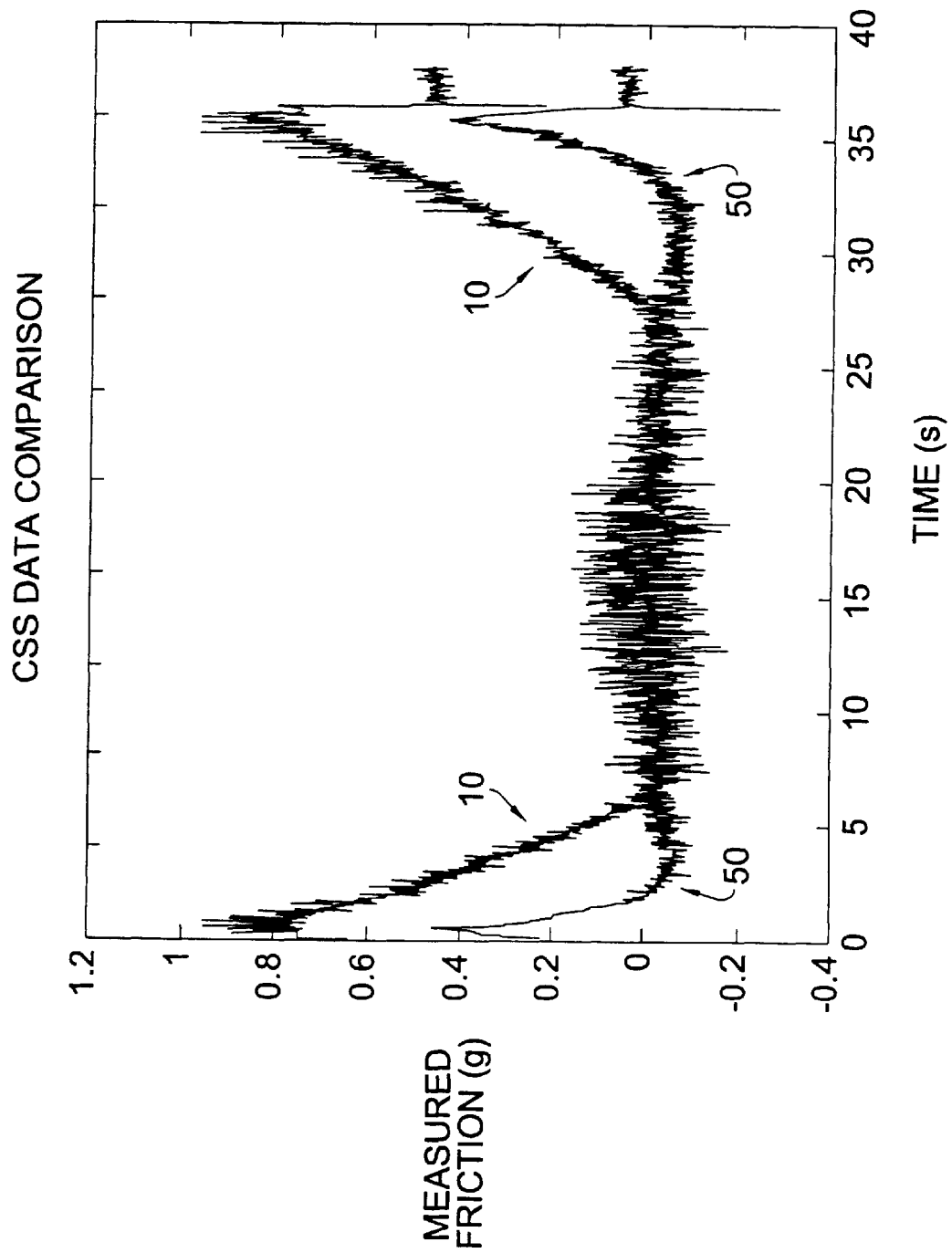
FIG. 4 is an additional, wider field of view graphical representation of the contact start/stop ("CSS") characteristics of a conventional slider as illustrated in FIG. 1 together with that of a textured ABS slider in accordance with the present invention as illustrated in FIG. 2 also showing much reduced measured friction with the associated media as a function of time as well as much less integrated work (the area beneath the friction curve) compared with that of a conventional ABS design.

With reference additionally now to FIG. 4, an additional graphical representation of the contact start/stop ("CSS") characteristics of a conventional slider 10 as illustrated in FIG. 1 is shown together with that of a textured ABS slider 50 in accordance with the present invention as illustrated in FIG. 2. The textured ABS slider 50 of the present invention also enables the slider 50 to take off from the media much earlier than the conventional slider 10 due to the presence of the textured areas 62 (FIG. 2). In this figure, the friction values were plotted as a function of time (or rotating speed) during a CSS cycle at the landing zone of the media. As shown, the textured ABS slider 50 of the present invention took off at about 2.5 seconds while the conventional slider 10 did not take off until about 7.0 seconds. Also, the small friction force of the textured ABS slider 50, compared with that of the conventional slider 10, will further enhance CSS wear performance since the integrated friction work (the area beneath the friction curve) is much less.

The textured ABS slider 50 design is seen to exhibit superior take-off behavior when compared to that of the conventional slider 10 because greater air pressure is established as it moves across the textured areas 62 than if the air bearing surface 30 were totally planar. The higher airflow air-bearing pressure beneath the textured slider 50 thus results in a higher flying height for a given rotational speed of the media. The amplitude of the texturing in the air bearing surface of the textured slider 50 is designed to be such that the flying height of the slider 50 at normal operational speed is at target. However, as the rotation speed decreases during the CSS cycle, the flying height decreases, and the textured areas 62 become effective in producing extra air bearing pressure and, thus, in increasing the slider 50 flying height. (On the other hand, under normal operational conditions, the textured areas 62 have relatively little impact on the increase of the air bearing pressure and, thus, on the flying height.)

While there have been described above the principles of the present invention in conjunction with a specific sub-ambient pressure ABS design and material removal technique, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A slider for positioning a head relative to a storage medium in a computer mass storage device, said slider comprising:

an air bearing surface including generally coplanar leading and trailing edge portions and a central portion therebetween;

a textured area formed in the central portion of the air bearing surface, the textured area being non-coplanar with the leading edge portion; and an interstitial strip positioned within the central portion separating the textured area into first and second areas, the interstitial strip having a surface coplanar with the leading edge portion and having a width less than a width of the first area and less than a width of the second area.

2. The slider of claim 1, wherein the textured area is recessed a depth from leading and trailing edge portions.

3. The slider of claim 2, wherein the depth is greater than about 0.01 µm.

4. The slider of claim 1, wherein the width of the interstitial strip is selected from a range of about zero to about 250 µm.

5. The slider of claim 1, wherein the width of the interstitial strip is at least about 250 µm.

6. The slider of claim 1, further including additional interstitial strips positioned in a spaced apart fashion within the central portion area to separate the textured area into a plurality of areas recessed relative to the coplanar surface of the interstitial strips.

7. The slider of claim 6, wherein adjacent ones of the interstitial strips are spaced apart a distance of about 0.05 to about 0.5 mm.

8. The slider of claim 7, wherein the total number of recessed areas in the textured area is less about 10.

9. The slider of claim 7, wherein the total area of the recessed areas is less than about 70 percent of the total area of the air bearing surface.

10. The slider of claim 1, wherein the central portion comprises a left side and a right side and further including a central cavity between the left and right side, the cavity being non-coplanar with the leading and trailing edge portions.

11. The slider of claim 10, wherein a plane of said cavity is recessed substantially 2.0–3.0 µm from a plane passing through the leading and trailing edge portions.

12. The slider of claim 11 further comprising:
   a pair of steps formed on opposing sides of said cavity, said pair of steps being non-coplanar with the leading and trailing edge portions.

13. The slider of claim 1, further comprising:
   a step formed on a leading edge of the air bearing surface for intercepting air flow between the slider and the storage medium in advance of the leading edge of the air bearing surface, the step being non-coplanar with the leading edge portion.

14. The slider of claim 13, wherein a plane of said step is displaced substantially 0.2 µm from the leading edge portion.

15. The slider of claim 1, wherein one of the trailing edges includes a data transducer.

16. A head slider for a data storage device, comprising:
   a data transducer for communicating with a data storage media; and
   an air bearing surface including a generally planar leading portion and first and second rails, wherein the first and second rails include at least two textured areas recessed from the leading portion and separated by an interstitial strip with a surface coplanar to the leading portion and further wherein a width of the interstitial strip surface measured along an airflow path is less than widths of the textured areas.

17. The head slider of claim 16, wherein the number of interstitial strips in the first and second rails is less than about 10.

18. The head slider of claim 16, wherein the widths of the interstitial strips range from about zero to about 250 µm.

19. The head slider of claim 16, wherein each interstitial strip extends transversely to the airflow path across the first or second rail.

20. The head slider of claim 16, wherein each interstitial strip is has a longitudinal axis and is positioned with the longitudinal axis substantially perpendicular to the airflow path.

21. The head slider of claim 16, wherein the air bearing surface further includes a trailing edge portion on each rail distal and coplanar to the leading portion.

22. The head slider of claim 16, wherein the widths of the textured areas is between about 0.05 and 0.5 mm.

23. The head slider of claim 22, wherein the total area of the textured areas is less than about 70 percent of the surface of the air bearing surface.

24. The head slider of claim 16, further including a center cavity between the first and second rail having a surface recesse from the surfaces of the interstital strips by a distance ranging from about 2 to 3 µm.

* * * * *